United States Patent [19]
Lamb

[11] Patent Number: 5,379,381
[45] Date of Patent: Jan. 3, 1995

[54] SYSTEM USING SEPARATE TRANSFER CIRCUITS FOR PERFORMING DIFFERENT TRANSFER OPERATIONS RESPECTIVELY AND SCANNING I/O DEVICES STATUS UPON ABSENCE OF BOTH OPERATIONS

[75] Inventor: Joseph M. Lamb, Hopedale, Mass.

[73] Assignee: Stratus Computer, Inc., Marlboro, Mass.

[21] Appl. No.: 743,992

[22] Filed: Aug. 12, 1991

[51] Int. Cl.$^6$ .................. G06F 13/00; G06F 13/28
[52] U.S. Cl. ............................... 395/275; 395/725; 364/242.3; 364/242.31; 364/242.34; 364/DIG. 1
[58] Field of Search ............ 395/275, 425, 725

[56] References Cited

U.S. PATENT DOCUMENTS

| | | | |
|---|---|---|---|
| 3,705,388 | 12/1972 | Nishimoto | 395/425 |
| 4,164,787 | 8/1979 | Aranguren | 364/200 |
| 4,275,440 | 6/1981 | Adams, Jr. et al. | 395/275 |
| 4,309,754 | 1/1982 | Dinwiddie, Jr. | 364/200 |
| 4,371,932 | 2/1983 | Dinwiddie, Jr. et al. | 364/200 |
| 4,486,826 | 12/1984 | Wolff et al. | 364/200 |
| 4,503,499 | 3/1985 | Mason et al. | 395/650 |
| 4,654,857 | 3/1987 | Samson et al. | 371/68 |
| 4,716,523 | 12/1987 | Burrus, Jr. et al. | 395/425 |
| 4,816,990 | 3/1989 | Williams | 364/200 |
| 4,866,604 | 9/1989 | Reid | 364/200 |
| 4,920,540 | 4/1990 | Baty | 371/61 |
| 4,926,315 | 5/1990 | Long et al. | 364/200 |
| 4,987,530 | 1/1991 | Wagner et al. | 395/275 |
| 5,020,024 | 5/1991 | Williams | 364/900 |

FOREIGN PATENT DOCUMENTS

| | | |
|---|---|---|
| 0009678 | 12/1979 | European Pat. Off. . |
| 0208430 | 12/1986 | European Pat. Off. . |
| 0293860 | 1/1988 | European Pat. Off. . |
| 0428330 | 8/1990 | European Pat. Off. . |

OTHER PUBLICATIONS

EPO Search Report for EP 92 11 3591.
Schnurr, "DMA-MeBtechnik mit einem PC," Elektronik, vol. 39, No. 8, pp. 90–102.
English language abstract of "DMA-MeBtechnik mit einem PC," (Publication AS), published by INSPEC, abstract No. B90052025, C90046972, Available Online through DIALOG information Services, Inc.

Primary Examiner—Thomas C. Lee
Assistant Examiner—Sang Hui Kim
Attorney, Agent, or Firm—Lahive & Cockfield

[57] ABSTRACT

An I/O controller for transferring data between a host processor and one or more I/O units. The controller interleaves processor command transfers (PIO) in the midst of direct memory access (DMA) transfers without repeated data moves. DMA transfers are suspended temporarily during the priority PIO transfer. An interrupt Scanner, for scanning the various I/O units, is also prioritized with respect to DMA and PIO transfers.

15 Claims, 10 Drawing Sheets

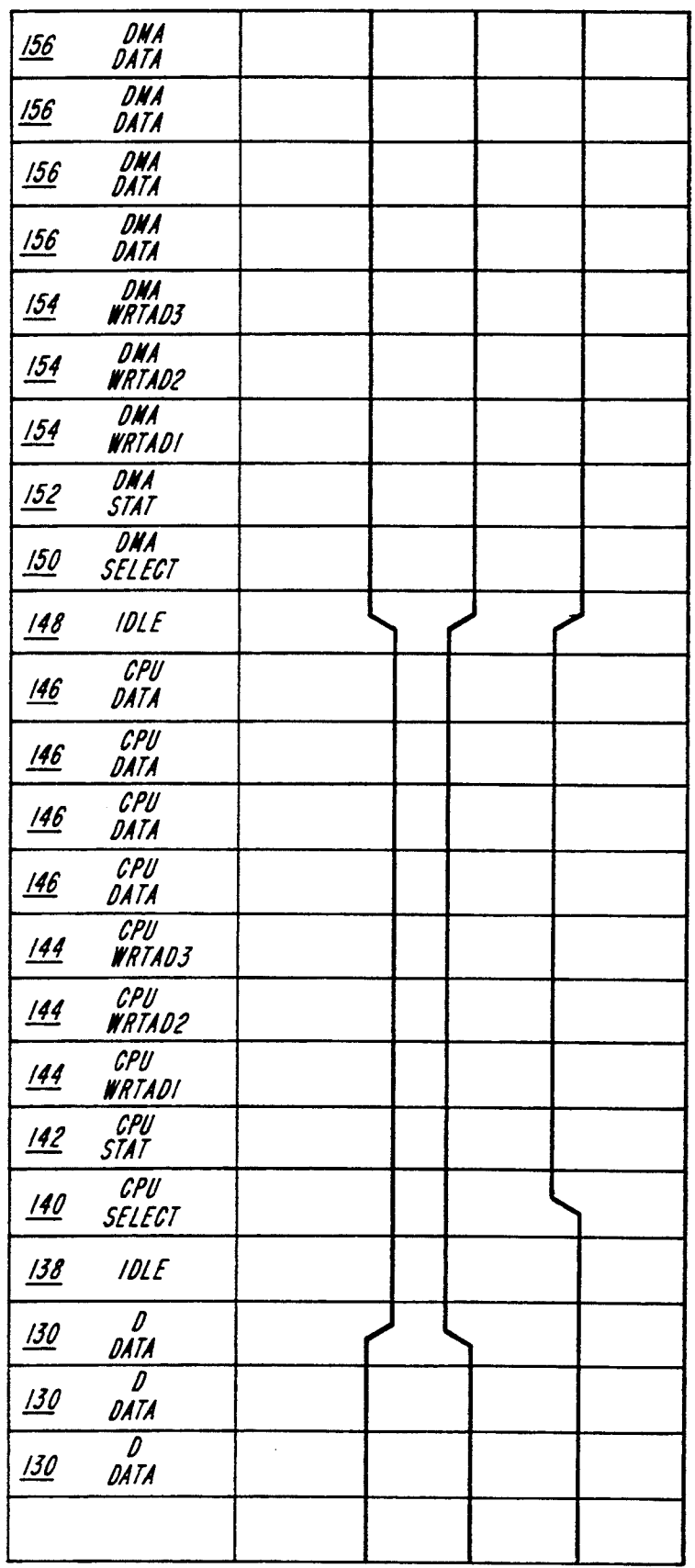

SYSTEM USING SEPARATE TRANSFER CIRCUITS FOR PERFORMING DIFFERENT TRANSFER OPERATIONS RESPECTIVELY AND SCANNING I/O DEVICES STATUS UPON ABSENCE OF BOTH OPERATIONS

BACKGROUND

This invention relates to a computer method and apparatus for transferring data between a processor section, i.e. a host processor, and an I/O section, i.e. one or more peripheral units or input/output units.

More particularly, this invention provides an I/O controller that can transfer multiple-byte blocks of data, in what is known as a direct memory access (DMA) transfer, and that can execute a processor commanded transfer, designated a PIO transfer, with high time efficiency.

I/O controllers are known for providing both processor commanded transfers, i.e. PIO transfers, and multiple-byte block transfers, i.e. DMA transfers. In general, a PIO transfer is executed in response to a command from the local processor in the I/O controller and transfers a word or other unit of information between the local processor and a designated I/O unit. The execution of a PIO transfer typically is brief, for example requiring approximately five microseconds in a systems operating with a sixteen megahertz clock. A direct memory access transfer, on the other hand, transfers a significantly larger quantity of data, typically designated as a block having a specified number of bytes, between the main storage unit of the host processor and a designated I/O unit. DMA transfer rates are approximately four megabytes per second in systems operating with a sixteen megahertz clock.

It is desirable, for time-wise efficient operation, i.e., a high system speed, that DMA transfers be executed promptly. It likewise is desirable that PIO transfers be executed promptly. In addition, it is preferable that PIO transfers are executed immediately, without waiting for the completion of an in-process DMA transfer, which could take several milliseconds. For example, if a DMA transfer were underway to one disk drive address, this could hold up a pending PIO to another disk drive address. For example, if the main system directed an I/O controller to send a command to another disk drive, the I/O controller would have to wait until the end of the DMA transfer. At the same time, however, it is inefficient to abort a DMA transfer in order to accommodate a PIO transfer and then require restarting of the same DMA transfer.

Among the known I/O controllers that handle both DMA transfers and PIO transfers are the model XA2000 computer systems of Stratus Computer, Inc., and the techniques disclosed in U.S. Pat. Nos. 4,926,315; No. 4,309,754; and No. 4,371,932. The noted U.S. Pat. No. 4,371,932 provides an interleaving mechanism that enables host processor direct program control data transfers to be performed on a cycle steal basis when the I/O controller is executing data transfers for a block of data. The patent describes a dual port random access storage mechanism to provide temporary storage in executing the DMA and the PIO data transfers.

It is an object of this invention to provide an improved method and apparatus for the transfer, between a host processor and multiple I/O units in a digital data processing system, of data on both a direct memory access basis and a processor command basis with high time-wise efficiency.

Another object is to provide such a method and apparatus for providing both DMA and PIO transfers with minimal wait for PIO transfers and minimal delay for DMA transfers.

It is a further object of the invention to provide an I/O controller that interleaves PIO-type transfers with DMA-type transfers with minimal delay for both kinds of transfers.

Other objects of the invention will in part be obvious and will in part appear hereinafter.

SUMMARY OF THE INVENTION

An I/O controller according to the invention responds to a request for a processor commanded data (PIO) transfer, during the execution of a direct memory access-type (DMA-type) transfer, by idling the DMA transfer without a change in its active status, executing the PIO transfer and then resuming the DMA transfer at the same point it was idled.

The controller employs control and status hardware to attain the idling and subsequent resumption of the DMA transfer with minimal added operational time.

The I/O controller attains this operation in part by the storage of status information regarding the DMA transfer in process, and the updating of that status information, and further by maintaining the system components involved in the DMA transfer in the same state of readiness to perform a DMA transfer both during the idling for an intervening PIO transfer as during the actual execution of the DMA transfer.

An I/O controller according to the invention has a local processor operating with a local storage unit, i.e. addressable memory, and transfers data between a host processor having a host memory and a peripheral device, i.e. an I/O device, on both a direct memory access (DMA) basis and on a processor command (PIO) basis. The I/O controller also can scan the status of each of multiple peripheral devices for interrupts. The I/O controller provides these transfers and the scan operation with a high level of time efficiency.

The I/O controller has a first data-transfer circuitry—for example a DMA Engine—and has a second data-transfer circuitry—for example an I/O bus control unit—that together move data during DMA transfers without control by the local processor, after being initialized and enabled for execution of a DMA instruction. The local processor accordingly is available to perform other tasks during DMA transfers.

The local processor can suspend a DMA operation to execute a PIO operation, thereby avoiding operating delays that would otherwise result by requiring the PIO operation to wait. Moreover, the DMA Engine can resume a suspended DMA operation at the point of suspension, thereby avoiding operating delays that otherwise would result from having to re-initiate the DMA operation.

In accordance with another aspect of the invention, the DMA Engine operates with a table for storing information associated with a DMA instruction and for counting the bytes of in-process DMA transfers. The DMA table is undisturbed when the DMA operation is suspended, thereby maintaining intact the contents of the DMA table.

The DMA table directs the DMA Engine for each byte to be transferred, in a manner that enables the DMA Engine to be suspended and be resumed, i.e.

re-enabled or re-selected, repeatedly during a DMA operation with a minimum of restart or other housekeeping or overhead operations.

In another aspect, the DMA Engine contains a counter for the DMA bytes being transferred during a DMA operation. The counter is inactive during a deselect of the DMA Engine, and active during DMA transfers. A DMA Engine can, in this aspect, be stopped in the midst of a DMA transfer and then restarted at the point at which it was stopped. The data moved for a given DMA transfer can then be finished without redundant or other repeated maneuvers.

In another aspect, the DMA Engine can store selective information to execute a DMA transfer. In an illustrative instance, it can designate the completion state of a given DMA transfer, for example whether or not the DMA transfer was completed or whether an error exists in the data that was transferred.

According to further aspects of the invention, the I/O controller stores a list of potentially executable, or candidate, DMA instructions. The DMA Engine accesses the list through a pointer set by local processor. The DMA Engine monitors, in a POLL state, a DMA instruction as indexed by the pointer. If the DMA instruction is executable, the DMA Engine processes the DMA instruction and increments the pointer to the next DMA instruction within the list. If the DMA instruction is not executable, the DMA Engine continues to scan that DMA instruction through successive IDLE and POLL states, until the DMA instruction becomes executable. At the end of the DMA Instruction List, the DMA Engine is incremented to loop to the beginning of the list to POLL the first DMA instruction.

The DMA instructions in the list are written from the local processor, which in addition specifies with a GO code that a DMA instruction is ready for execution. The GO code can be written to a DMA instruction even while the DMA Engine scans the entry.

If, at any point in the DMA Instruction List, the DMA Engine has returned to the same instruction and does not POLL an executable entry, the DMA Engine waits at that location within the list until the local processor makes another entry into the DMA Instruction List. When the local processor makes another entry into the list, the DMA Engine again enters the POLL/IDLE states, and resumes scanning the DMA instruction.

In another aspect, the I/O controller of the invention provides a dual port storage ram to receive and store information from the local processor, and to store the list of candidate DMA instructions. The storage ram is coupled to a clocking arrangement which prevents access conflicts, and in particular Write conflicts, between the local processor and the DMA Engine.

In yet another aspect, the I/O controller employs a WRITEPIPE buffer arrangement between the local processor and the data writing operations of the I/O processor. This logic arrangement removes the inherent delays present in the host bus due to the overhead operations of the local processor and of Write operations associated with the DMA Engine.

In still another aspect, the I/O controller employs a CHECKSUM storage operation, which is selectable through the I/O controller, and which stores the arithmetic sum of the bytes transferred across the I/O bus. CHECKSUM operations are useful in monitoring the byte content during multiple transfers of data, ensuring that all bytes are moved.

According to still another aspect of the invention, digital logic apparatus is provided for transferring multiple bytes of information, and for communication with a host processor and a host memory. The apparatus includes storage for a DMA Instruction List, and DMA Engine logic circuitry to interface with the DMA Instruction List. During successive IDLE/POLL states, the DMA Engine scans a candidate DMA instruction within the list for a code indicating an executable DMA instruction. If an executable DMA instruction is found, the DMA Engine processes the instruction and scans the next entry within the list. The DMA Engine loops to the start of the list after executing the last entry in the DMA Instruction List. If the DMA Engine overtakes the list and does not find an executable entry, the DMA Engine waits for the local processor to write into the list of candidate DMA instructions. Once an entry is made, the DMA Engine resumes its scan of the DMA instruction.

The digital logic apparatus has another aspect including sequence control logic. When the DMA Engine is in successive IDLE and POLL states, the DMA Engine scans a DMA instruction for a code indication an executable instruction. After an executable DMA instruction is selected, the DMA Engine loads certain information about the DMA instruction into the DMA Engine counters. In one illustrative embodiment, this information includes: PFADR, specifying the bus slot and the source/destination address on the I/O side of the DMA transfer; BCOUNT, specifying the data type and byte count of the DMA transfer; and MEMADR, specifying a location in system memory for the DMA transfer.

In addition, the DMA logic circuitry begins a logical data-move operation for the selected DMA instruction. If the DMA Engine is writing to an I/O device, the DMA Engine reads data from the host memory. If, on the other hand, the DMA Engine is reading data, the DMA Engine fills an available buffer. When the buffer is full, the data is written to the host memory until the byte count is zero.

According to this aspect, a completion status is written into the DMA Instruction List denoting that either the DMA transfer was completed or that an incorrect type of data or memory address was specified. At that point, the latest DMA transfer is cleared, the pointer which points to the current location in the DMA Instruction List is incremented, and the DMA Engine resumes operation in its IDLE and POLL states.

In a further aspect of the invention, the digital logic apparatus includes CHECKSUM logic. This logic, when selected, writes information regarding the data bytes of a DMA transfer into the current DMA transfer instruction.

According to another aspect of the invention, a DMA Engine contains a counter that is selectively deactivated by a priority operation of an I/O controller. Upon the completion of a priority operation, the DMA Engine and counter resume—at the point of interruption—the DMA transfer.

The advantages of an I/O controller having the foregoing features are several. First, such a DMA Engine can be temporarily stopped and restarted without redundant data transfers or losses of DMA status. In addition, the relatively small data transfers of PIO commands can be efficiently prioritized over DMA transfers, which can involve the time-consuming transfer of large blocks of data. Further, the operations performed by the CPU, the DMA Engine, and the Scanner remain uninhibited even with the assertion of a PIO command. Each continues to be ready to operate as though no priority assertion had occurred.

These and other aspects of the invention are evident in the drawings and in the description which follows.

BRIEF DESCRIPTION OF THE DRAWINGS

The foregoing and other objects of the invention, the various features thereof, as well as the invention itself, may be more fully understood from the following description, when read together with the accompanying drawings in which:

FIG. 8 shows a cycle interleave chart illustrating operation of the PBUS Controller logic shown in FIG. 1.

DESCRIPTION OF ILLUSTRATED EMBODIMENTS

Figure 1:
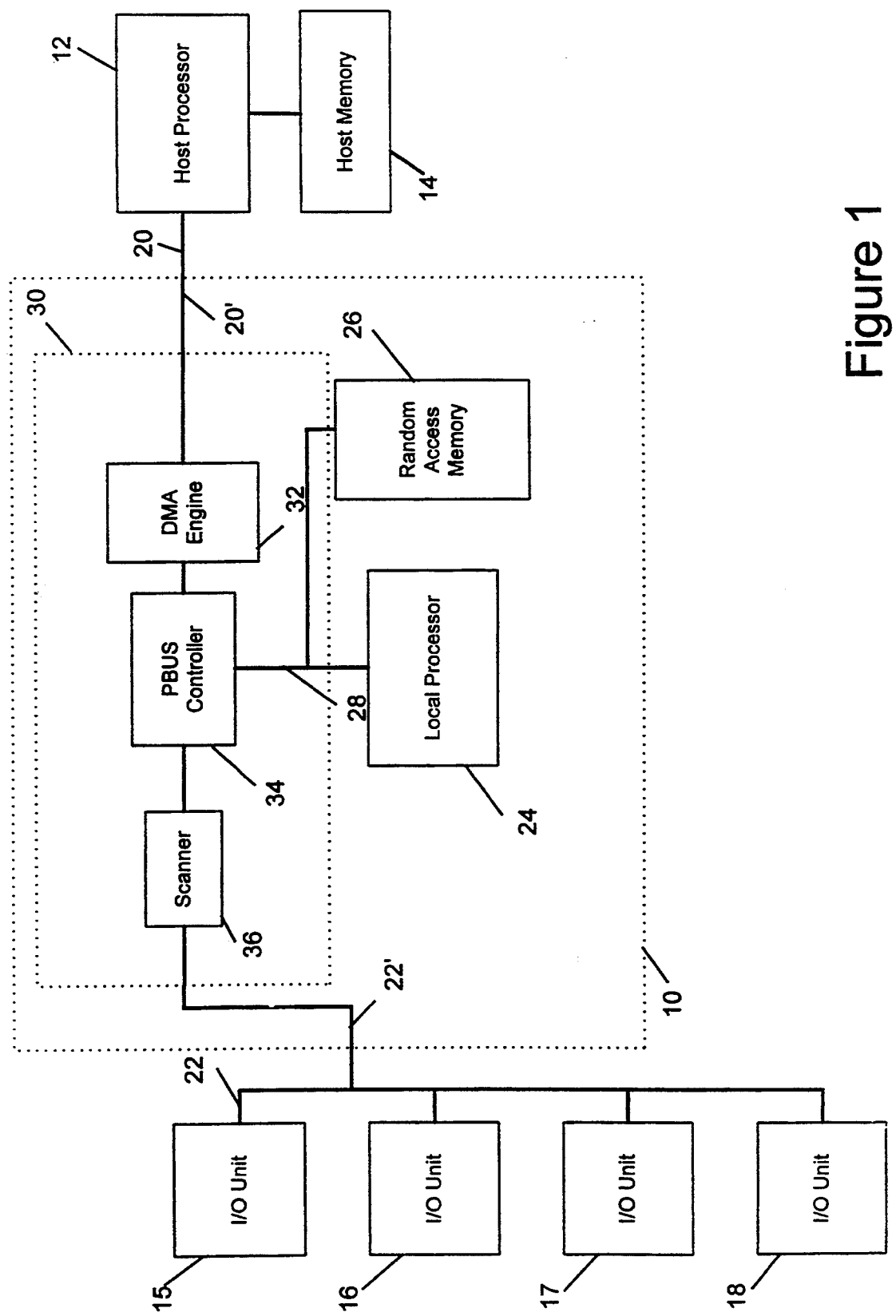
FIG. 1 is a schematic block diagram of a digital data processing system utilizing an I/O controller constructed in accordance with the invention.

FIG. 1 shows a block diagram of a digital data processing system utilizing an I/O controller 10 in accordance with the invention. The system depicted includes a host processor 12 coupled to a host memory 14, an I/O controller 10, and a multitude of I/O units 15–18. The host processor 12 communicates to the several I/O units 15–18 through a host bus 20 that is connected to the I/O controller 10, and through an I/O bus 22 that is connected between the controller 10 and the various I/O units 15–18. The I/O controller has a host bus extension 20' and an I/O bus extension 22'.

The I/O controller 10 operates with a local processor 24, such as a Motorola MC68030 32-bit microprocessor, and a local random access memory 26. The microprocessor 24 communicates between the host processor 12 and the several I/O devices 15–18 through a local processor bus 28. The Gate-Array 30 in the controller 10 provides the interface path between the local processor bus 28, the host bus 20 and the extension 20', and the I/O bus 22 and extension 22'. There are two mechanisms for transferring data through the I/O bus, a DMA (direct memory access) transfer, consisting of large blocks of data, and a PIO (peripheral I/O command) transfer, consisting of relatively small amounts of data, for example one to four bytes per access.

The illustrated Gate-Array 30 has a first data-transfer co-processor 32, for example a DMA Engine, for transferring DMA data between the I/O bus 22 and the extension 22', and either the local processor bus 28, or the host processor bus 20 and the extension 20'. The Gate-Array 30 has a second data-transfer co-processor 34, namely, a PBUS Controller, for enabling the transfer of PIO data by the local processor 24 through the I/O bus 22 and the extension 22'.

The first data-transfer logic circuitry 32 is hereinafter referred to as a "DMA Engine", for clarity of the description. Although certain features of the Gate-Array 30 can be attained with a conventional DMA Engine, a DMA Engine 32 as described below embodies further features of the invention and is preferred.

The I/O controller 10 thus provides substantially separate logic circuits for DMA transfers and for PIO transfers. The DMA Engine 32 provides the former and the local processor 24 provides the latter. Both the local processor 24 and the DMA Engine 32 communicate with other elements of the controller 10 and with the buses 20 and 22 through the PBUS Controller 34 within the Gate-Array 30.

Other logic circuitry in the Gate-Array 30 and associated with the PBUS Controller 34 provides a de-selection and re-selection capability of the DMA Engine, whereby the logic circuits of the DMA Engine 32 can be temporarily frozen in the midst of a DMA transfer. This suspension of the DMA Engine allows the PBUS Controller 34 to process a priority data transfer, e.g., a PIO data transfer. The I/O controller 10 thus enables the local processor 24 to give priority to PIO data transfers in favor of DMA transfers. In this operation, the Gate-Array 30 suspends and thereby stops any DMA transfers in progress, performs the PIO access, and then resumes the DMA transfer where it left off, with no loss of data and with only few redundant or repeated operations.

In addition, the illustrated I/O controller 10 has a Scanner 36, which is also linked to the PBUS Controller 34. The illustrated Scanner 36 is a separate logic unit for scanning the several I/O units 15–18 for pending interrupts. The illustrated Scanner 36 contains a register of four long-words for storing the interrupt status information of the several I/O units during a scan. In a preferred embodiment, as illustrated, the Scanner 36 does not access the I/O bus 22 for conducting a Scanner cycle if either a DMA transfer or a PIO transfer is in progress.

The I/O controller 10 therefore dictates priority access requests, giving highest priority to the local processor 24 and related PIO transfers, next priority to DMA Engine 32 accesses, and lowest priority to Scanner 36 cycles. Accordingly, the local processor 24, the DMA Engine 32, and the Scanner 36 access the I/O bus 22 as though each were non-interruptable. The DMA Engine, however, is suspended or frozen during higher priority operations. Scanner 36 cycles are released only when they do not conflict with PIO transfers and with DMA transfers.

A more complete operational understanding of the I/O Controller 10 may be obtained by the following description, together with reference to U.S. Pat. No. 4,926,315, the teachings of which are incorporated herein by reference. That patent discloses a prior I/O controller of the assignee hereof. For example, a preferred embodiment of the I/O bus 22 is a fault-tolerant, multiplexed and burst-mode bus providing (n) datums for only one address transfer, where (n) is a positive integer, as described in U.S. Pat. No. 4,926,315.

Figure 2A:
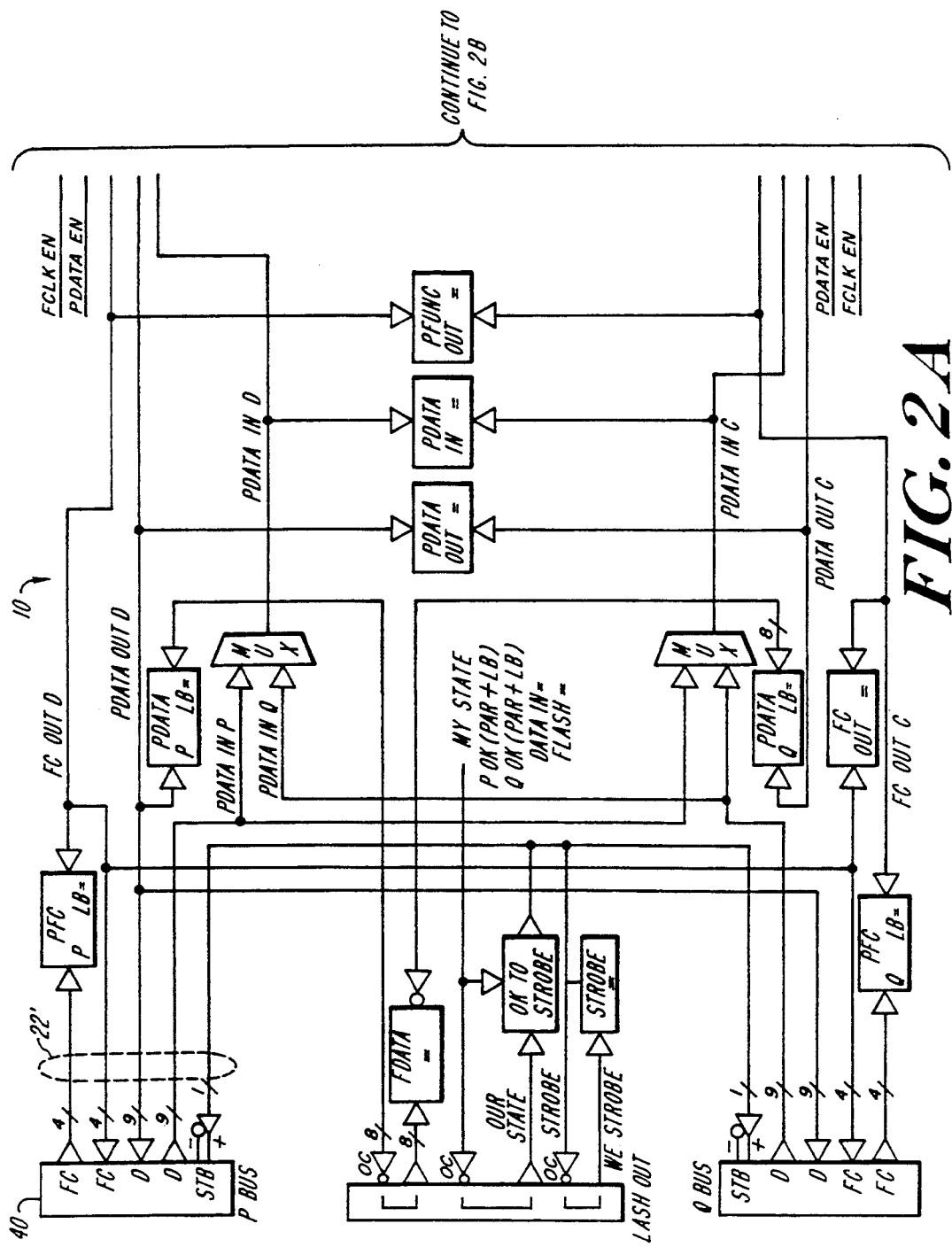
FIG. 2 illustrates an I/O controller for use in the system of FIG. 1, and showing various data paths.
Figure 2B:
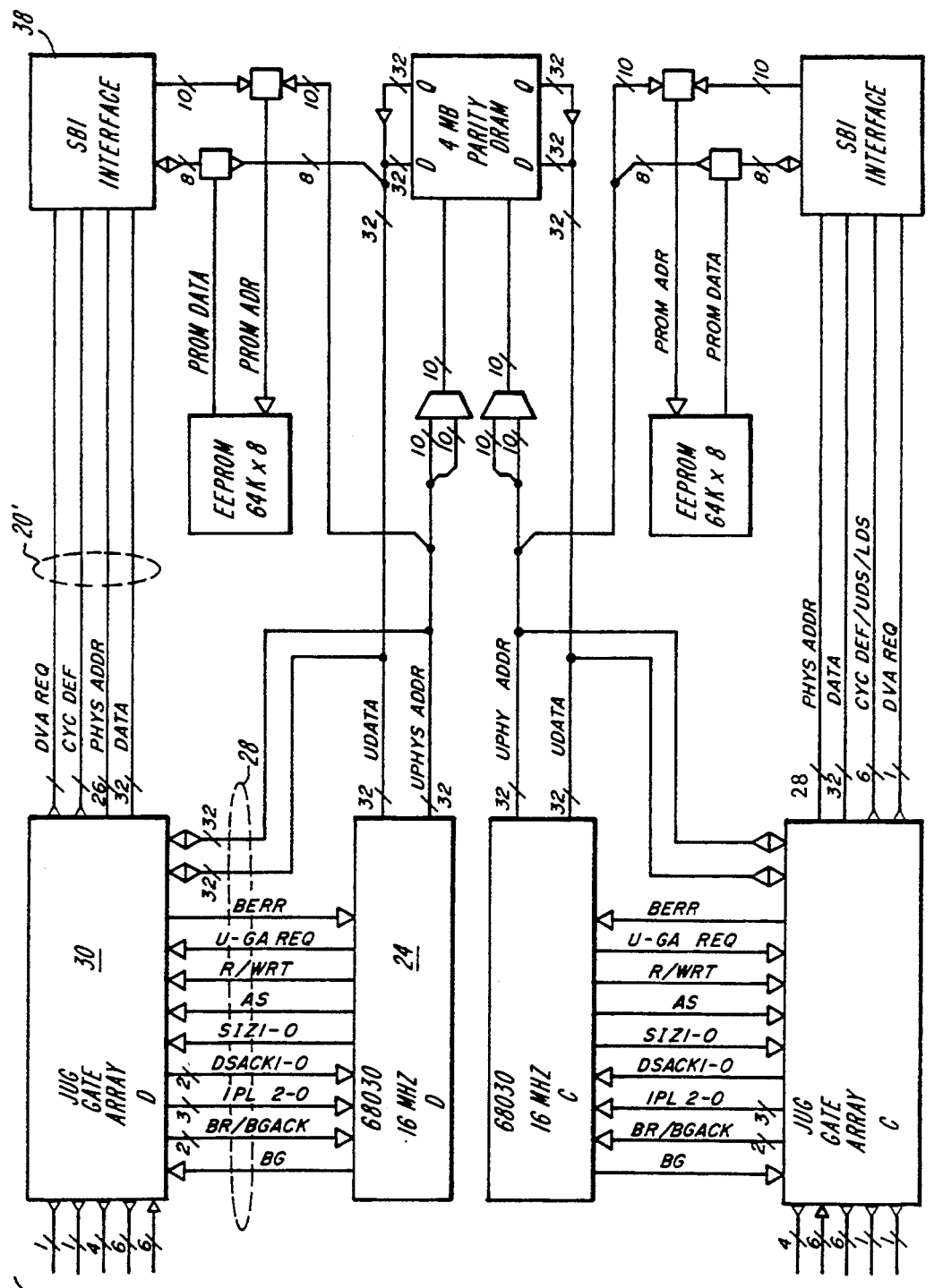

FIG. 2 shows further detail of the I/O controller 10 and shows data paths and control connections between the several major components. The illustrated local processor 24 is an MC68030 chip operating at 16 MHz. The processor 24 is linked to the Gate-Array 30 via the local processor bus 28, which contains several control lines. The Gate-Array 30 is the interface element between the host processor 12 (FIG. 1), connected via the host bus extension 20' and the host bus 20 (FIG. 1), the several I/O units, connected through the I/O bus extension 22' and the I/O bus 22 (FIG. 1), and the local processor 24, connected through the local processor bus 28. An interface stage 38 connects to the host bus 20 and the host bus extension 20', which connects to the Gate-Array 30. An interface stage 40 connects to the I/O bus 22 and the I/O bus extension 22', which connects to the Gate-Array 30.

The controller 10 is shown in FIG. 2 connected with an identical controller, in the same manner set forth in the above-noted U.S. Pat. No. 4,926,315, for fault tolerant operation with that second controller. Data comparison circuits are connected between the two processors, for error-checking purposes. Further, as also known, the two processors are connected with a flash bus. This showing in FIG. 2 is illustrative of a specific preferred embodiment, and the invention is not so limited.

Figure 3A:
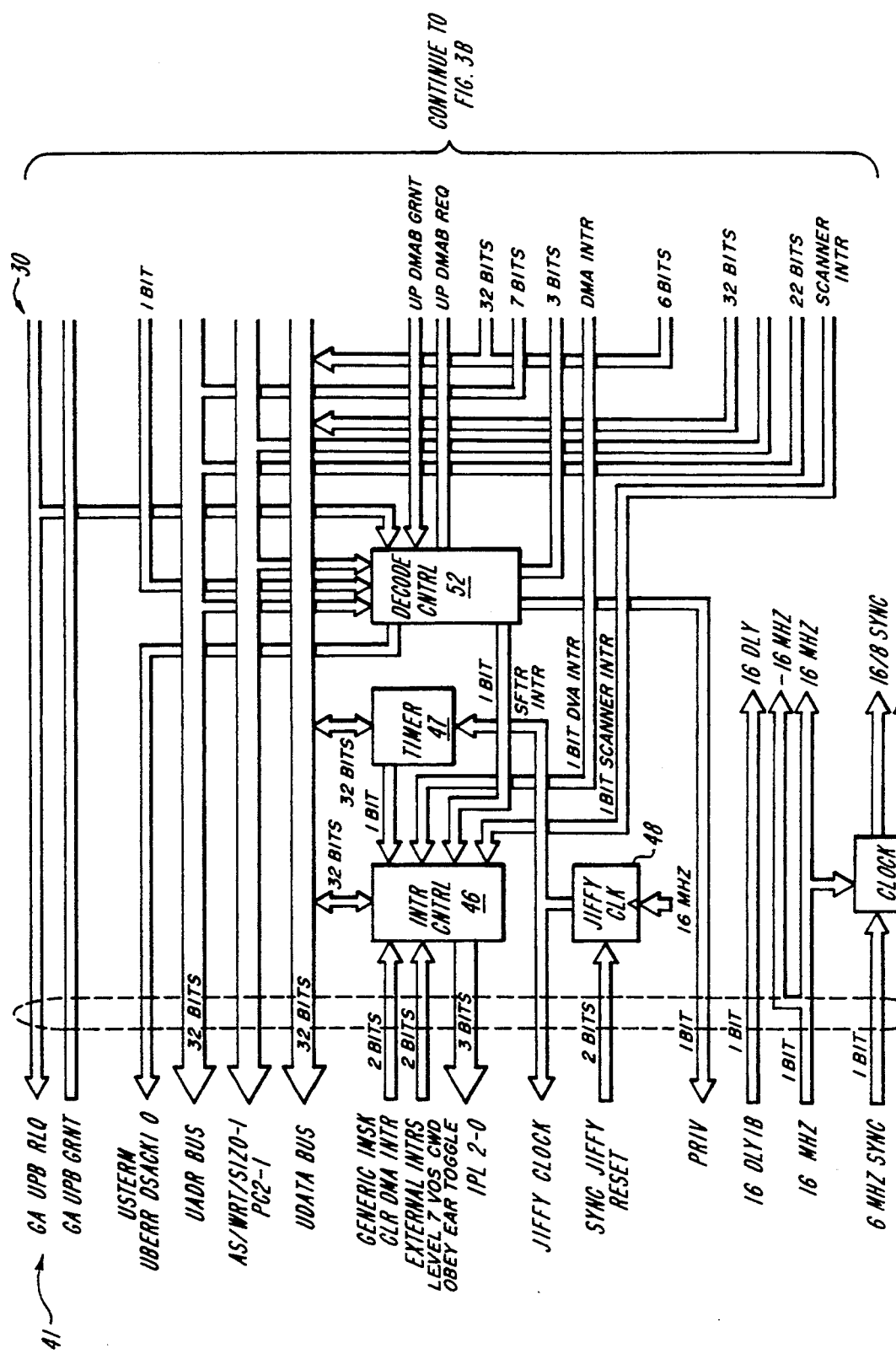
FIG. 3 shows Gate-Array logic for use in the I/O controller of FIG. 2.
Figure 3B:
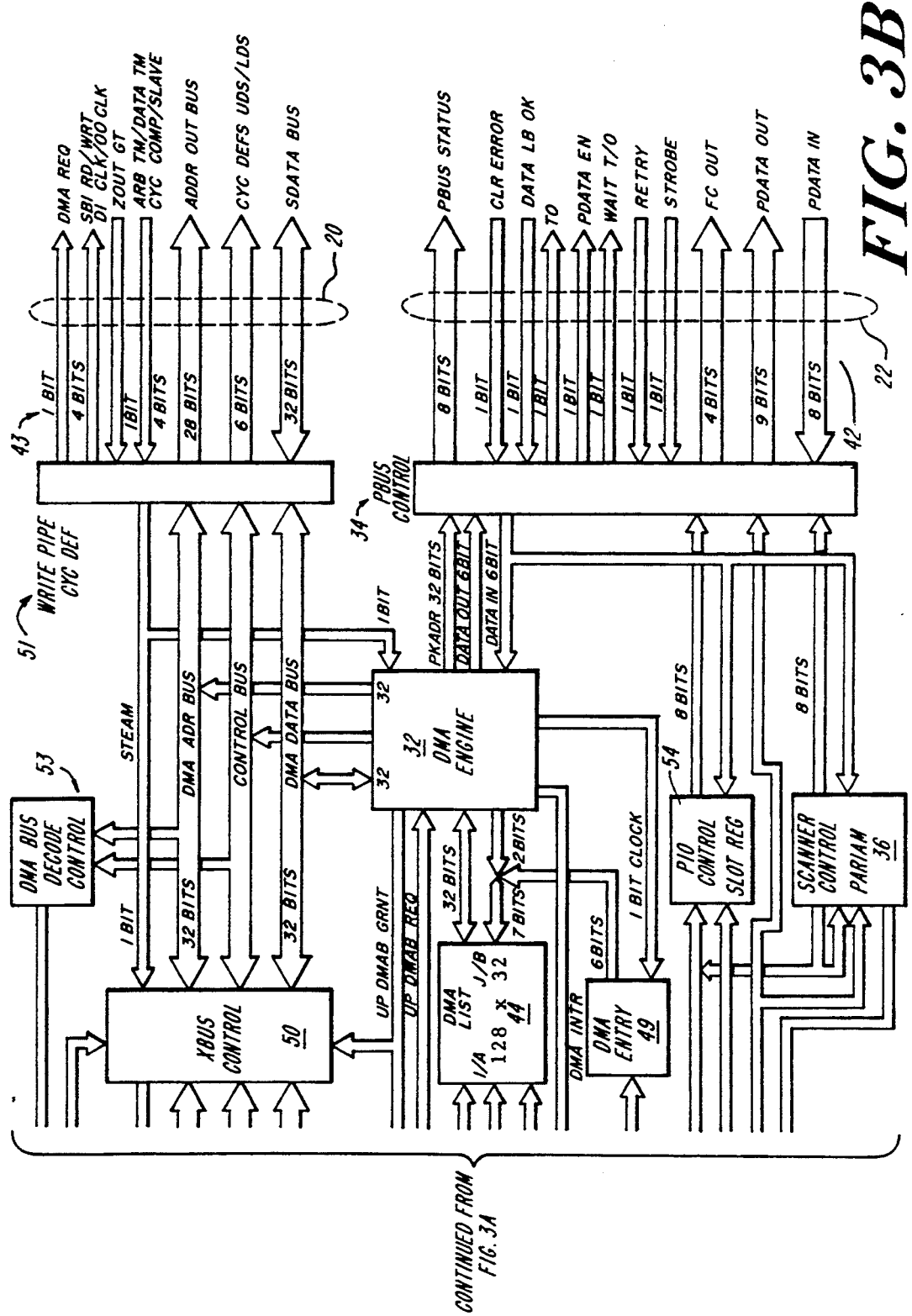

FIG. 3 shows the Gate-Array 30 of FIG. 1 and several data paths within. The DMA Engine 32, the PBUS Controller 34, and the Scanner 36 function within the Gate-Array 30. The left side 41 of FIG. 3 shows data paths of the local processor bus 28, which connects to the local processor 24. The lower right portion 42 of FIG. 3 shows data paths of the I/O bus extension 22'. The upper right portion 43 of FIG. 3 shows data paths of the host bus extension 20'.

The DMA Engine 32 is a data-moving co-processor that resides within the Gate-Array 30. It processes DMA instructions as indexed by a pointer received from the local processor. This pointer is Read/Write accessible by the local processor. The illustrated DMA Instruction List 44 is a memory element within the Gate-Array 30 that stores a 32-entry circular list of Transfer Control Blocks (TCB). The local processor 24 sets the DMA pointer to an address of the DMA Instruction List 44, whereafter the DMA Engine 32 scans a DMA instruction for a GO code indicating that the DMA instruction is ready for execution. The local processor writes the GO code into the DMA instruction.

Each TCB entry is four long-words, consisting of PKADR (an I/O bus slot and start transfer address), MEMADR (an address in memory), BCOUNT (providing the byte count and the data type of the transfer), and STATUS (denoting the completion status of a given DMA transfer and the CHECKSUM byte count, or a GO code). CHECKSUM is calculated for all DMA transfers and is stored along with the completion status in the STATUS long-word. The CHECKSUM can be appended to a DMA transfer automatically during DMA Write operations and is used as a comparator during a Read operation when the CHECKSUM DMA types are selected. The CHECKSUM count is useful in magnetic media transfers, for example, where it can be used to check that the appropriate byte count was transferred.

The STATUS entry allows the DMA Engine 32 to select valid or executable entries from the list 44. If a given TCB entry is not valid, the DMA Engine scans that TCB entry through successive POLL and IDLE states until a valid GO code is entered by the local processor. Once a valid GO code is read, the DMA Engine 32 loads the other three entries from the DMA instruction into the DMA Engine 32 counters, i.e., PKADR, MEMADR, and BCOUNT. The PBUS Controller 34 then selects the appropriate I/O address for the transfer, based on the PKADR field which includes the I/O bus slot and the start transfer address.

When the DMA Engine 32 finds a valid entry within the DMA Instruction List 44, the DMA Engine 32 asserts the DMA transfer request to the PBUS Controller 34 logic flow. During the DMA transfer, the DMA Engine 32 updates the counters so that if the DMA is suspended, it can be restatted at the same transfer position. If the DMA Engine 32 is in fact suspended, it is transparent to the Engine, since it simply continues the interrupted DMA transfer after the intervening request is completed. The counter is not incremented during the interruption and no loss of data or corruption of the CHECKSUM occurs. Once the DMA transfer is completed, the completion states are written into the STATUS entry by the DMA Engine 32, and the DMA pointer is "bumped," i.e., incremented, to the next entry. The DMA Engine 32 knows that the Write operations of a DMA transfer are complete when the byte counter is zero and the write buffers are empty.

The DMA Engine 32 follows through the DMA Instruction List 44 and marks the completion status in the STATUS long-word of each executed TCB. When entry #31 is completed, the next entry checked is #0. If the DMA Engine overtakes the list at any point and does not read a valid STATUS long-word, i.e., the entry within the list 44 is not executable, the DMA Engine waits until the local processor 24 makes another entry into the DMA Instruction List 44. When such an entry is made, the DMA Engine resumes checking the entry within the list 44 for a valid DMA instruction, i.e. a GO code. Valid DMA instruction entries are in the last long-word of a TCB, and, in a preferred practice, are denoted by 0000474F for a GO entry. The local processor 24 writes the first three long-words entries into the TCB before writing a valid entry into the STATUS long-word. When a given DMA transfer is completed, or aborted, the completion status is non-zero and the CHECKSUM is that of the transferred data. Therefore, when the DMA Engine enters a STATUS long-word, i.e., CHECKSUM and completion status, the entry is different from a GO code.

DMA transfers utilizing CHECKSUM information are similar to other DMA transfers. When the DMA Engine writes to an I/O address and the byte count goes to zero, two bytes of generated CHECKSUM are appended to the transfer before the I/O address is de-selected. CHECKSUM is appended to the STATUS long-word in the TCB entry.

When reading from an I/O address, the Gate-Array 30 continues to read bytes of data until the byte count goes to zero. If the DMA-type specifies that it includes a CHECKSUM, the Gate-Array 30 in addition reads the next two bytes from the I/O address and compares this to the generated CHECKSUM. Should the two values not compare, an appropriate entry is placed into the STATUS completion entry of the TCB. If, on the other hand, the DMA-type does not specify a CHECKSUM, no comparison is processed.

The DMA Engine 32 issues an interrupt to the local processor 24, upon the completion of a DMA transfer, when that is specified by the DMA-type.

The DMA Instruction List 44 is stored within a dual port storage RAM by the local processor 24. The arrangement avoids the Write access conflicts which would occur between the local processor 24 and the DMA Engine 32 by using the different clocking edges on a common 8 MHz clock. This clock is a phased version of the 16 MHz system clock of the local processor and is created by the SYNCH Clock 45. The DMA Engine 32 begins operation on the starting edge of an 8 MHz clock, and takes information, in its POLL state, on the falling edge. When the local processor writes information into the DMA Instruction List 44, it starts 30 ns after the falling edge of the 8 MHz clock and completes the Write operation at the rising edge, i.e., where the DMA Engine 32 begins its access for a Read.

With regard to avoiding Read access conflicts of the RAM that stores the list 44, while the DMA Engine 32 writes the completion status and the CHECKSUM into the TCB entry within the list 44, the DMA Engine 32 controls the local processor bus (28 of FIG. 1), and thereby prevents conflicting Read access to the bus by the local processor.

The Gate-Array 30 has other operational controls and circuitry, including:

A. A SYNCH CLOCK 45 that is the clock distribution system. For instance, the SYNCH CLOCK 45 generates the 8 MHz clock utilized by the Gate-Array 30 for the access avoidance scheme within the dual port storage RAM containing the DMA Instruction List 44.

B. A Priority Interrupt Controller 46 that programmably assigns interrupt priority levels to the low-level devices sending interrupts to the local processor. The local processor processes interrupts according to the priority level assigned to a particular device. For example, when several interrupts are pending, the Scanner 36 request can be selected in favor of a Timer 47 request, provided the controller 46 is programmed to provide higher relative priority to the Scanner 36.

C. A Timer 47 that contains two items, a forty-eight bit DELTA timer, which uses a 15.259 microsecond JIFFY clock 48 interval to count time monotomically, and a twenty-four bit interval timer, which sets the interrupt interval by and for the local processor. These functions are primarily for measuring event process times.

D. A JIFFY clock 48 that processes the 16 MHz clock from the local processor to generate the Timer 47 JIFFY clock interval.

E. A DMA Entry Counter 49 that is a five-bit counter set by the local processor. The counter 49 is incremented by the DMA Engine 32 and provides five of the seven bits for the address for the DMA entry within the DMA Instruction list 44.

F. An XBUS Controller 50 that contains a series of multiplexers which handle the arbitration between the local processor bus 28 and the DMA Engine 32.

G. A WRITEPIPE unit 51 that is a pipelining mechanism used whenever the I/O controller 10 needs to write to a host bus 20 address. The WRITEPIPE 51 provides a buffer between the local processor 24 and the host bus 20 and extension 20' (FIG. 1), thereby removing inherent delays in the host bus operation from the overhead of the local processor and from DMA Write operations. The WRITEPIPE 51 is a one-level operation buffer that buffers one operation at a time.

H. A DECODE Control unit 52 that decodes the access requests from the local processor for the Write enabled devices within the Gate-Array 30.

I. A DMA Bus Control unit 53 that determines whether addresses from the DMA Engine are for the I/O bus or for local processor bus 28.

J. A PIO Control unit 54 that takes PIO requests from the local processor and passes the PIO request to the PBUS Controller 34 to perform the transfer.

Figure 4A:
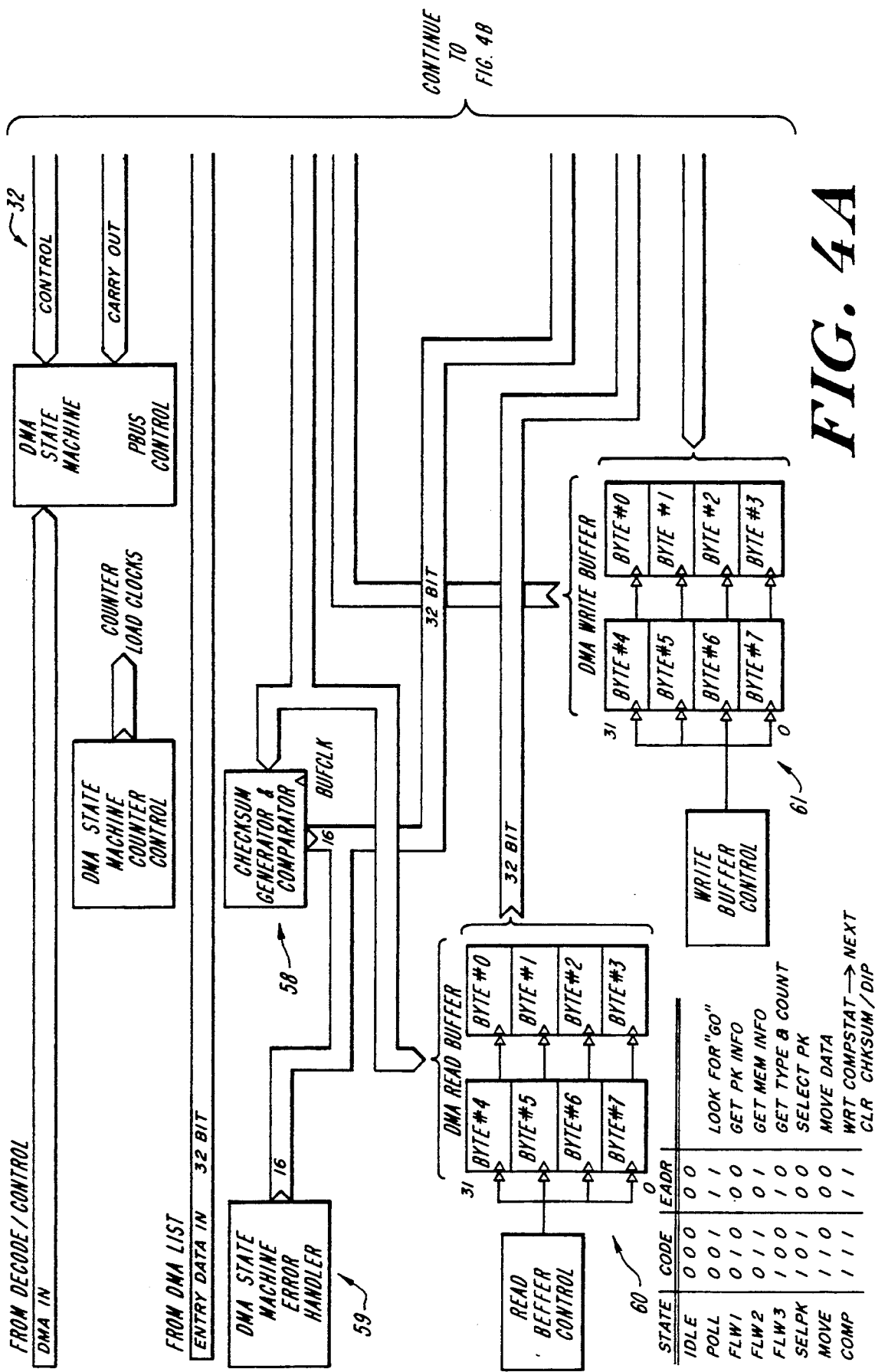
FIG. 4 shows a DMA Engine for use in the I/O controller of FIG. 2.
Figure 4B:
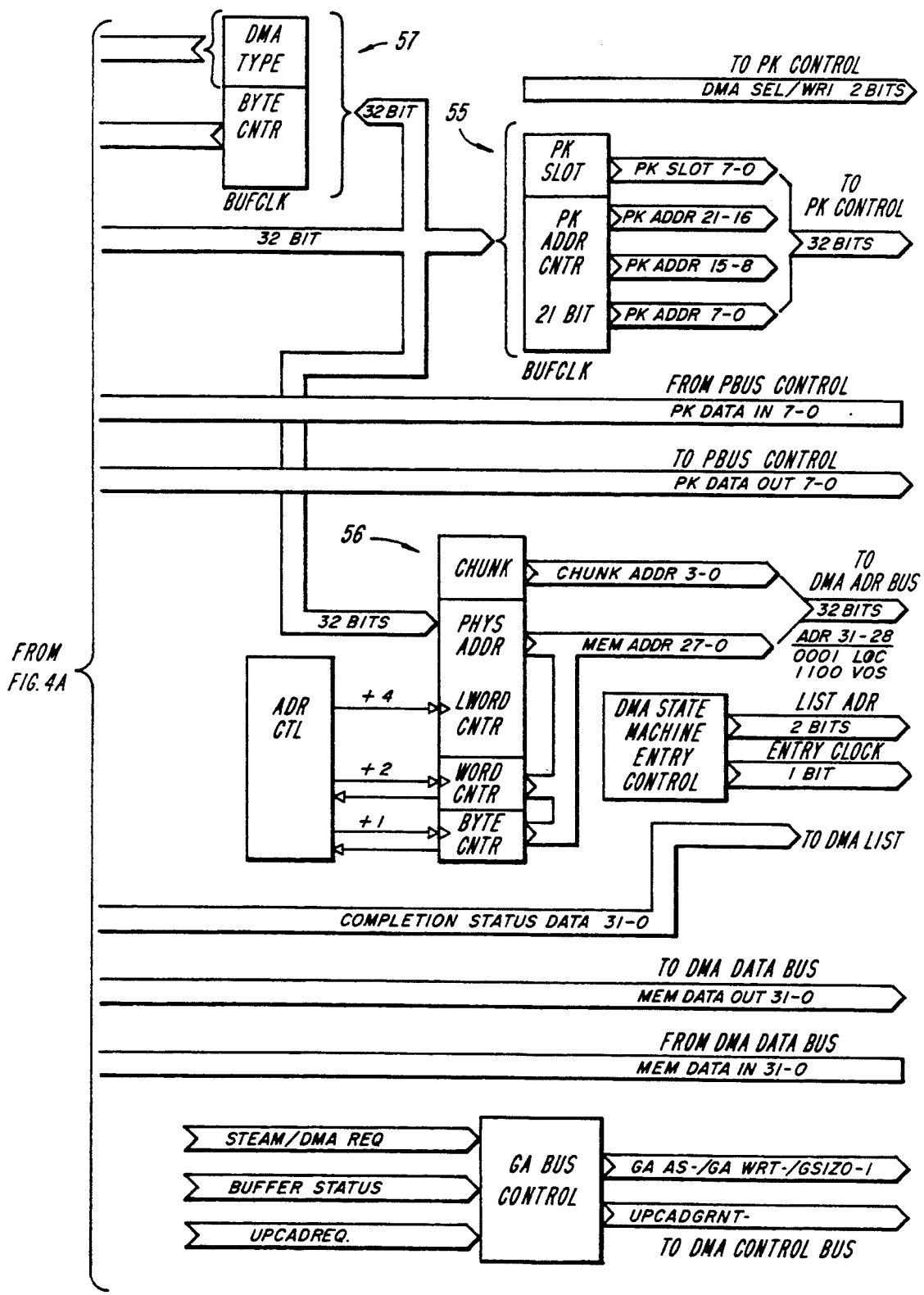

FIG. 4 shows the DMA Engine 32 that is part of the Gate-Array 30. FIG. 4 shows, more specifically, data paths and counters of the DMA Engine 32. For instance, the PKADR long-word, from the DMA Instruction List 44 of FIG. 3, is stored in the PKADR counter 55. The MEMADR long-word is similarly stored in the counter section 56. The DMA type and byte counter is stored at the BCOUNT counter 57. The STATUS long-word is formed by the merger of two sixteen bit words. The CHECKSUM Generator 58 provides half of the long word in a CHECKSUM, and the DMA State Error Handler 59 provides the other half in a Completion Status. In addition, FIG. 4 shows a four long-word Read buffer 60 and a Write buffer 61 in communication with the PBUS Controller 34 (FIGS. 3 and 1).

Figure 5:
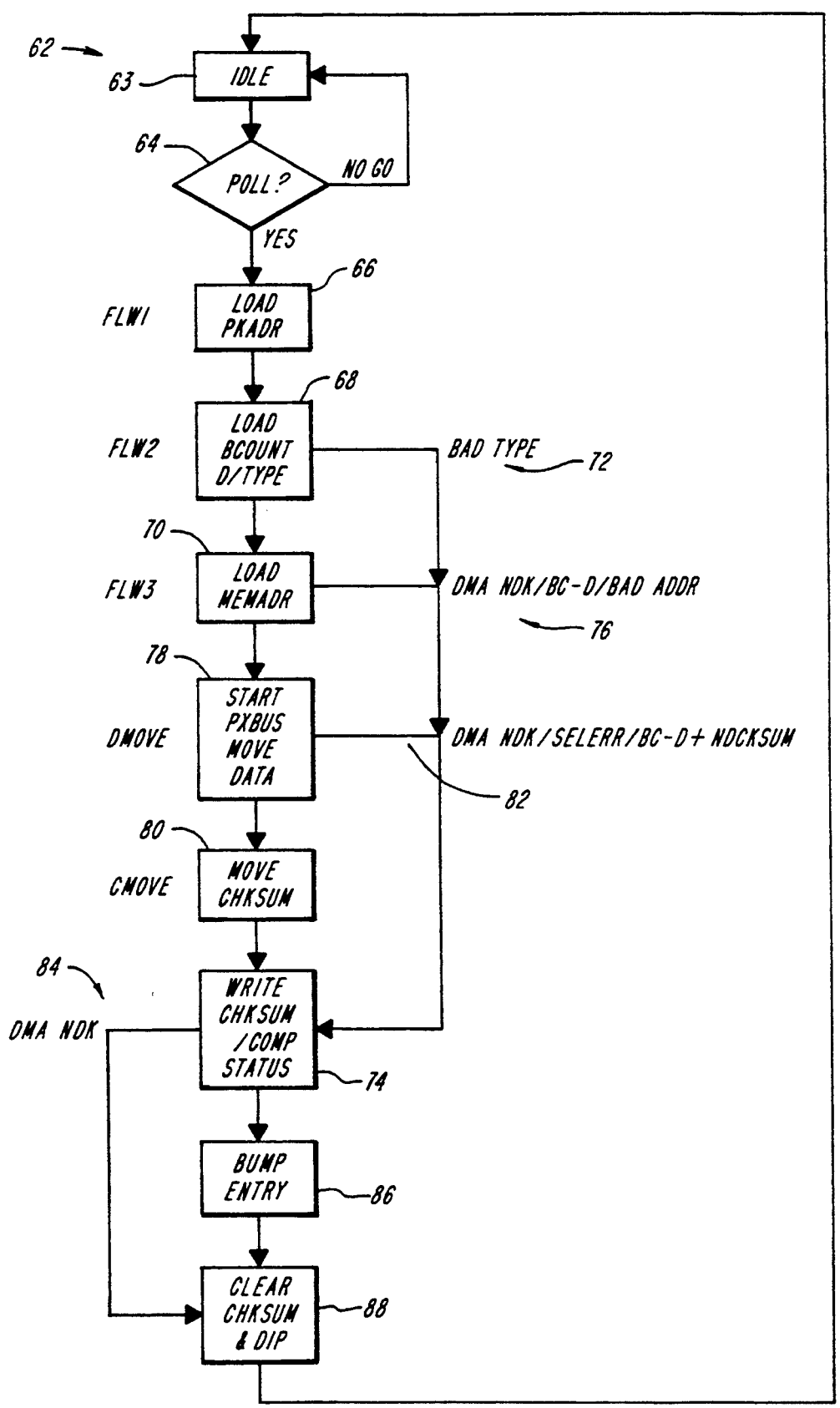
FIG. 5 shows a flow diagram illustrating operation of the DMA Engine of FIG. 4.

FIG. 5 illustrates the DMA Engine operating flow diagram and state table 62. At the beginning of the flow diagram, the DMA Engine scans a TCB entry in the DMA Instruction List through successive states, IDLE 63 and POLL 64. During these states, the DMA Engine scans a DMA instruction as indexed by a pointer from the local processor. Once a valid entry is found and the POLL state yields an affirmative result—i.e., once the STATUS long-word of the TCB indicates a GO/-STATUS—the DMA Engine begins loading the other three long words: PKADR, BCOUNT, and MEMADR, as indicated with action boxes 66, 68 and 70, respectively. If the DMA Engine loads an incorrect data type, the operation follows a branch 72 and the DMA Engine makes an entry indicating this. The entry is made at action box 74 by entering into the STATUS entry of the current TCB the appropriate values for both the completion status and the CHECKSUM. A similar branch operation 76 occurs if a bad memory address is specified. When the DMA Engine writes into the STATUS long-word, it no longer indicates a GO code.

The DMA Engine logic enters a data move state 78 after successful loading of the above long-words. If the current DMA transfer is without CHECKSUM status, or the DMA transfer has an error, the DMA Engine does not move CHECKSUM, per operation 80, but proceeds along a branch operation 82 to write corresponding information into the STATUS entry 74. The TCB is marked at the STATUS entry 74 with an error status and a CHECKSUM value, even if the CHECKSUM operation is not specified. A valid DMA transfer with the CHECKSUM operation does execute the move CHECKSUM operation 80, and proceeds to operation 74 to write into the STATUS entry. The completion status is written into the STATUS long-word of the TCB.

If the DMA transfer failed or encounters an error, the operation enters a DMA NOT OK (NOK) state 84, and by-passes the Bump Entry operation 86 so that the pointer to the DMA entry within the candidate DMA Instruction List is not incremented. The TCB pointed to is no longer valid. It follows that the pointer needs to remain at the same position. If, however, the DMA transfer is successful, the counter is incremented, by operation 86, to point to the next DMA instruction in the DMA Instruction List. The internal status of the pointer dictates which CHECKSUM and DMA in progress (DIP) is cleared at the state position 88, so that the DMA Engine can resume its IDLE state 63 and POLL state 64.

Figure 6:
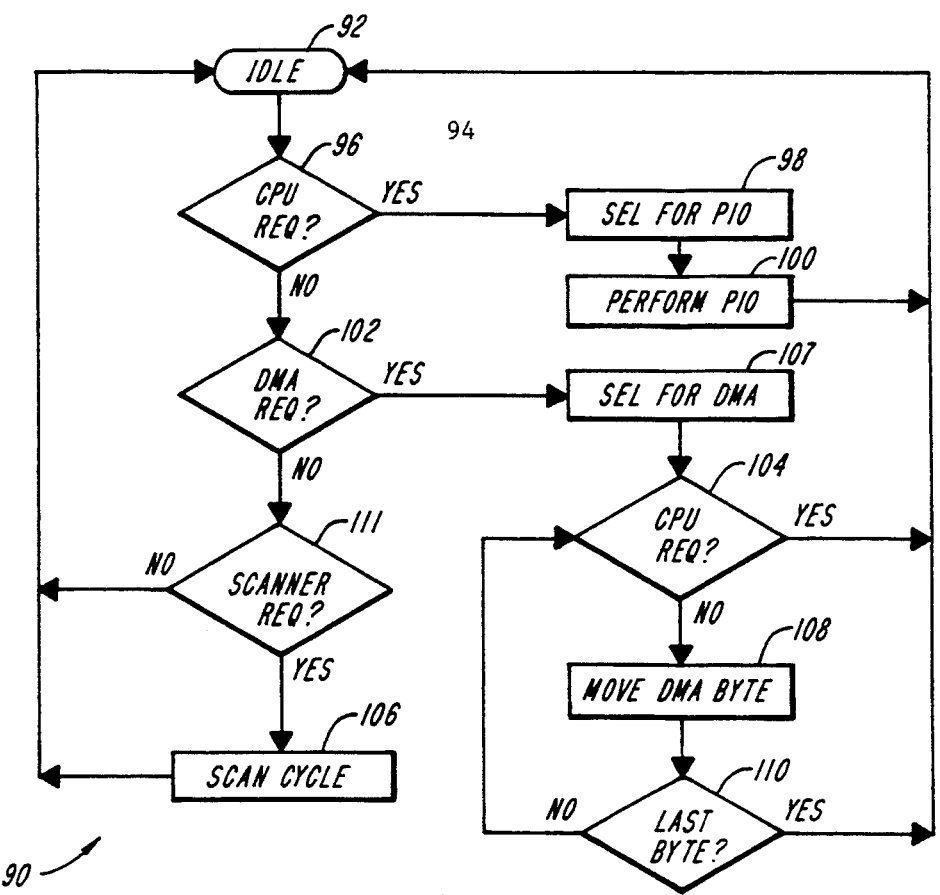
FIG. 6 shows a flow diagram illustrating operation of the PBUS Controller logic shown in FIG. 1.

FIG. 6 shows the PBUS Control flow diagram and state table. The interleave of PIO and DMA operation is controlled by the PBUS Controller 34 logic (FIGS. 1 and 3). The DMA Engine itself has no logical awareness (i.e., has no change in a signal level within the Engine) that a PIO interleave has occurred. When the PBUS Controller is enabled, it starts in an IDLE state 92. From the IDLE state 92, the PBUS Controller can switch to a SELECT state in response to commands from either the local processor, the DMA Engine, or the Scanner, and in that order of priority.

More particularly, decision box 96 shows that the local processor request for a PIO command, which is a high priority command for the PBUS Controller, causes the PBUS Controller to switch to a Select PIO state 98. The Controller next performs the PIO transfer, per action box 100, and returns to the IDLE state 92.

When there is no request of a PIO transfer, so that decision box 96 yields a negative result, the Controller operation can respond to a command for a DMA transfer, with decision box 102, and switch to a SELECT for DMA state 107. However, since a request for PIO transfer is of higher priority than the DMA transfer, decision box 104 shows that the former request will return the PBUS Controller to the IDLE state 92, from which it proceeds via decision box 96 to execute that PIO transfer, per action boxes 90 and 100. When a DMA operation is not interrupted, so decision box 104 has a negative result, the Controller operation proceeds to move a byte of data for the DMA operation, per action box 108.

The DMA transfer operation continues through decision box 110 to repeat the operations of decision box 104, with interleaved execution of any PIO transfer, and of action box 108 to transfer successive data bytes. When the last byte is transferred, the operation per decision box 110 returns the Controller to the IDLE state 92.

FIG. 6 also shows that in the absence of both a PIO request and a DMA request, the operation of the PBUS Controller proceeds from decision box 102 to determine whether a scan operation is requested, per decision box 111. If affirmative, the Controller executes a scan cycle, per action box 106. If not, the Controller returns to the IDLE state 92.

If a SCAN operation is in progress when a DMA REQ is posted, the scan cycle of operation 106 terminates normally, and the DMA REQ, per decision box 102, proceeds until completion, unless interrupted by the local processor, per decision box 104. No scan cycles of operation 106 interrupt a DMA operation, although scan cycles do occur during the time interval between adjacent DMA requests.

When a CPU REQ is asserted, see decision box 96, the PBUS Controller state logic waits until the return to IDLE state 92, if not already there, and then proceeds to a SELECT state. During a SELECT state, the SELECT function code is asserted to the PBUS Controller from the local processor, which also asserts the slot number of the I/O address to be selected. At this point, the status information about the I/O address is stored and decoded. The next three operations are WRITE ADDRESS BYTES HI, MID, and LO with a write function for each. The actual read or write operations requested by the local processor are then processed, e.g., per action box 100. This sequence terminates with an IDLE function code, where the PBUS Controller state logic returns to IDLE, awaiting for the next request.

Similarly, a DMA REQ command, per decision box 102, causes the same SELECT sequence as the CPU REQ, except that the I/O address, cycle type, and slot number come from the DMA Engine instead of the local processor. Once selected for a DMA transfer per action box 107, the DMA Engine moves DMA data, per action box 108, across the PBUS Controller until the byte count of the DMA transfer is zero, as determined per decision box 110, when the cycle terminates and the state machine returns to the IDLE state 92. When a CPU REQ occurs in the midst of a DMA transfer, as indicated with decision box 104, this occurrence appears as a large delay between cycles on the PBUS Controller, although the DMA Engine remains unaware of the interrupt. All the same information for a DMA select comes from the DMA Engine, even the restart information.

The PBUS Controller processes a Scanner REQ similarly, per decision box 111. The PBUS Controller logic de-asserts a Scanner REQ command both when a CPU REQ is asserted and when a DMA REQ is asserted.

Figure 7:
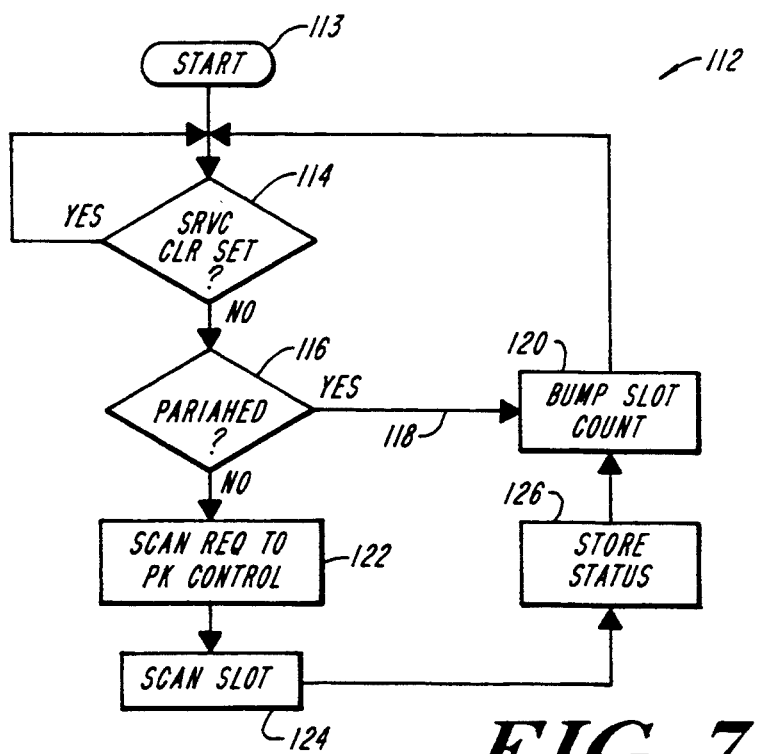
FIG. 7 shows a flow chart illustrating operation of the Scanner depicted in FIG. 1.

FIG. 7 shows the Scanner 36 (FIGS. 1 and 3) flow diagram and state table 112. Once the Scanner is turned on 113 by the local processor, at start box 113, it is first gated through the SRVC CLR SET per discussion box 114. SRVC CLR SET indicates a status bit that stops the Scanner when the local processor indicates a Scanner stop operation and processes the pending interrupts accumulated by the Scanner. After processing the pending interrupts, the local processor restarts the Scanner by clearing the SRVC CLR SET bit, to attain an affirmative result from decision box 114, whereafter the Scanner continues to scan from the location at which it was stopped.

More specifically, the illustrated Scanner collects, and stores in a register in the Scanner control unit 36 of FIG. 3, eight bits of interrupt status information on the connected I/O units. When the Scanner locates an interrupt, it posts that interrupt to the local processor through the PBUS Controller according to the priority assigned to Scanner interrupts in the Priority Interrupt Controller 46 (FIG. 3). The Scanner continues to collect the interrupt status from other devices even if the local processor has not processed the interrupt recognized previously. When the local processor is ready to process a Scanner interrupt, it interrogates the Scanner register containing the one or more pending interrupts, each stored by the Scanner with the eight bits of status information for the connected I/O unit. The SRVC CLR SET is set, thereby stopping the Scanner, at the interrogation of the Scanner register and when the local processor indicates a Scanner stop. Otherwise, the Scanner would continue to acquire the same pending interrupts from the I/O units.

With further reference to FIG. 7, if the local processor has not set the SRVC CLR SET, the Scanner collects the I/O interrupt requests from the connected I/O units, unless specific I/O units are to be by-passed (not scanned) as determined by a PARIAHED decision box 116. PARIAHED information is held by a sixteen bit register in the Scanner Control Unit 36 (FIG. 3); one bit for each connected I/O unit. Bits which are cleared in the PARIAHED register indicate which I/O units are scanned. The state of the PARIAHED bit signals the Scanner whether or not to post a request to the PBUS Controller to perform a scan. If the bit is selected as PARIAHED, the Scanner will not request the PBUS Controller to scan that particular I/O unit.

Thus, if the PARIAHED register indicates a PARIAHED I/O, with an affirmative decision from decision box 116, the Scanner increments the slot count, action box 120, to check the next entry in the PARIAHED register. Otherwise, the Scanner posts a scan request to the PBUS Controller if an I/O is UNPARIAHED, decision box 122. The PBUS Controller selects the Scanner if no other request, i.e., DMA or PIO, is asserted, with a delay period sufficient to ensure that at least three slots are scanned. After selection, the Scanner scans the appropriate slot, action box 124, and acknowledges the scan with the stored scan clock, per action box 126. The slot location is then incremented for the next scan cycle.

FIG. 8 shows a sequence of operating cycles and corresponding signal levels during an illustrative embodiment of the status interleave between DMA and PIO data transfers. More specifically, logic signal waveforms 132 and 134 show the select status of the PBUS Controller when the local processor asserts a PIO request during a DMA transfer.

A DMA transfer in progress is shown as DDATA cycles 130, 130. The PBUS Controller logic is set high for the DMA Select state, see waveform 132, and set low for local processor Select state, see waveform 134, during the DMA transfer cycles 130, 130. Once the local processor asserts a request per waveform 136, the PBUS Controller enters an IDLE state, see cycle 138, thereby de-selecting, i.e., setting low, the DMA Select state waveform 132 at byte N of the DMA transfer cycles 130, 130.

After the assertion of a local processor request, e.g., a PIO command waveform 136, the PBUS Controller logic is set high for the local processor Select state waveform 134 at cycle 140. After an interval cycle 142, the status information for the I/O address is captured and examined, at cycles 144, 144, whereby the Read or Write operation, e.g., the PIO transfer of cycles 146, 146, of the local processor are undertaken. The operation 146, 146 can take one or more cycles.

After completing the operation cycles 146, 146, the PBUS Controller enters an IDLE state, see cycle 148, where the local processor Select state waveform 134 is set low, and the DMA Select state waveform 132 is set high. The DMA operation is selected at cycle 150. After an interval cycle 152, the status information for the I/O address is captured, at cycles 154, 154, for the interrupted DMA transfer at cycles 130, 130. The DMA Select state waveform 132 remains high at the continuing of the DMA transfer, cycles 152, 152, at byte count N+1 of the de-selected DMA transfer of cycles 130, 130.

If neither the DMA select state waveform 132 nor the local processor select state waveform 134 are set high, a Scanner cycle could be selected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. For example, although only four I/O units are illustratively shown in FIG. 1, it will be appreciated that the teachings herein are equally applicable to an I/O controller 10 having a different number of I/O units connected to the controller.

What is claimed is:

1. An output/output (I/O) controller, for connection with an I/O bus and with a host processor bus, for transfer of data between one or more I/O devices connected with said I/O bus and a host processor having a host storage unit and connected to the host processor bus, said I/O controller having a local processor operating with a local storage unit, said I/O controller comprising:
  A. means for storing a list of candidate DMA instructions, along with one or more codes indicating whether one or more of those instructions are ready for execution,
  B. first data transfer means for executing, upon being selected, data move operations of a direct memory (DMA) transfer instruction, for transferring multiple bytes of data between the I/O bus and the host bus,
  said first data transfer means including means for accessing information from said list of candidate DMA instructions upon receipt of a pointer generated by said local processor,
  C. second data transfer means for executing, upon being selected, a controller instruction for transferring bytes of data between the local processor and the I/O bus,
  D. scan means for scanning, when selected, the status of said one or more I/O devices connected to the I/O bus,
  E. logic circuitry for selecting said first data transfer means for executing the data move operations of a first DMA transfer instruction when said second data transfer means is not selected,
  said logic circuitry being responsive to a request for execution of a controller instruction, during selection of said first data transfer means and execution thereby of data move operations of a first DMA transfer instruction, for successively
    i) de-selecting said first data transfer means to idle execution of said data move operations of said first DMA transfer instruction thereby,
    ii) selecting said second data transfer means for executing the requested said controller instruction to transfer bytes of data between the local processor and the I/O bus,
    iii) re-selecting said first data transfer means for execution of further said data move operations of said first DMA transfer instruction, re-commencing as of a status thereof at the time of being de-selected, and
  said logic circuitry including means for selecting said scan means in the absence of both a request for said controller instruction and for a DMA transfer instruction.

2. An I/O controller according to claim 1, wherein said first data transfer means has table means for storing information for executing a DMA instruction and has means for updating the status of said stored information in said table means, as a data byte is transferred,
  said table means retaining said information upon said data transfer means being de-selected,
  so that, when said data transfer means is de-selected and then re-selected, said table means identifies a next data transfer operation of the DMA instruction that was in process at the time of the de-selection.

3. An I/O controller according to claim 1, wherein said first data transfer means includes counter means to increment byte counts during a DMA transfer, and wherein the contents of said counter means remain fixed during said de-select of said first data transfer means, thereby facilitating the continuing of said DMA transfer upon re-selection of said first data transfer means.

4. An I/O controller according to claim 1 wherein said first data transfer means includes means for storing information for executing a DMA instruction and for writing the completion states of that DMA instruction.

5. An I/O controller according to claim 1, said first data transfer means includes IDLE and POLL means for scanning an entry within said list of candidate DMA instructions for a code indicating said entry is ready for execution.

6. An I/O controller according to claim 1 wherein said first data transfer means includes loop means for scanning through said list of candidate DMA instructions repeatedly.

7. An I/O controller according to claim 1, wherein said first data transfer means further includes
   IDLE and POLL means for scanning successive entries in said list of candidate DMA instructions for a code indicating an instruction is ready for execution,
   WAIT means for determining whether said list of candidate DMA instructions contains no instructions ready for execution and for responding to such determination for waiting at an entry in said list of DMA instructions to which said WAIT means was pointing to at a time of said determination, and
   said first data transfer means includes means for resuming said scan of entries within said list of candidate DMA instructions by said POLL and IDLE means in response to writing of new information into said list of candidate DMA instructions.

8. An I/O controller according to claim 1, wherein said list of candidate DMA instructions has means for receiving information from said local processor and for storage into said list of candidate DMA instructions.

9. An I/O controller according to claim 1, wherein said I/O controller includes
   (i) a dual port storage ram means, for storing a list of candidate DMA instructions, and for receiving and storing information from said local processor and from said first data transfer means, and
   (ii) means for preventing access conflicts between said local processor and said first data transfer means.

10. An I/O controller according to claim 1, wherein said I/O processor includes a writepipe, wherein said writepipe acts as a buffer between said local processor and the data write operations of said I/O controller.

11. An I/O controller according to claim 1, wherein said I/O processor includes CHECKSUM means, wherein
   (i) said CHECKSUM means is selectable in the operation of said I/O controller,
   (ii) said CHECKSUM means stores the DMA bytes transferred during a DMA transfer across said I/O bus.

12. Digital logic apparatus for the transfer of multiple bytes of information, and in communication with a host processor and host memory, the apparatus comprising
   A. listing means for storing a list of candidate DMA instructions,
   B. a DMA engine containing data moving logic, and including
      (i) pointer read means, for receiving and interpreting a pointer to an instruction in said list of candidate DMA instructions,
      (ii) POLL and IDLE means, for scanning each of successive instructions in said list of candidate DMA instructions and selecting a next DMA instruction ready for execution,
      (iii) WAIT means for determining that no DMA instruction ready for execution exists in said list of candidate DMA instructions and for responding to such determination for
         (a) placing said DMA Engine in a WAIT state, at a location in said list of candidate DMA instructions where said DMA Engine interprets no DMA instruction ready for execution exists,
         (b) terminating said WAIT state and resuming said scanning by said IDLE and POLL Means upon writing of new information into said list of candidate DMA instructions
   C. PKADR load means, coupled with said listing means and with said DMA engine, for loading a bus slot and an address of a selected DMA instruction form said list of DMA instructions into said DMA engine, and
   D. BCOUNT load means, coupled with said listing means and with said DMA engine, for loading into said DMA engine a type and an indicator of a number of bytes to be transferred for a selected DMA instruction from said list of DMA instructions, and
   said DMA Engine writes a completion status and returns to said IDLE state upon receipt of a bad data type,
   E. MEMADR load means, coupled with said listing means and with said DMA engine, for loading into said DMA engine a memory address of a selected DMA instruction from said list of DMA instructions, and
   F. said DMA engine includes means for writing a completion status into said list of DMA instructions and for returning control to said IDLE means upon receipt of a incorrect memory address.

13. The apparatus according to claim 12 wherein the apparatus further includes write means, for writing into and identifying a selected DMA instruction from said list of candidate DMA instructions.

14. The apparatus according to claim 12 wherein said DMA Engine is in communication with a host processor, a host memory, and an I/O device, and further comprises sequence control means, in connection with said IDLE and POLL means, and responsive to selection of a DMA instruction by said POLL means, including
   A. MOVE data means, for selecting said bus slot of said selected DMA instruction, and wherein said MOVE data means reads from said host memory if said DMA Engine is writing to said I/O device, or said MOVE data means fills a buffer and writes to said host memory until when said buffer is full,
   B. COMPLETION STATUS means, for writing the completion state of current DMA transfer into said selected DMA instruction,
   C. DIP means, for clearing DMA in progress status, D. BUMP means, for incrementing said pointer to next sequential position in said list of candidate DMA instructions.

15. The apparatus according to claim 14 wherein said sequence control means further comprises CHECKSUM logic circuitry, including A. activation means, for selecting and activating said CHECKSUM logic circuitry.

B. CHECKSUM write means, for writing into selected I)MA instruction a CHECKSUM,

C. CLEAR CHECKSUM means, for clearing CHECKSUM status, whereby CHECKSUM is information available to said DMA Engine as to the data bytes transferred during selected DMA transfer and entered into said DMA instruction with a completion state.

* * * * *